US010171295B2

(12) United States Patent
Nečas et al.

(10) Patent No.: US 10,171,295 B2
(45) Date of Patent: Jan. 1, 2019

(54) DISTRIBUTED REMOTE EXECUTION

(71) Applicant: Red Hat, Inc., Raleigh, NC (US)

(72) Inventors: Ivan Nečas, Brno (CZ); Marek Hulán, Brno (CZ); Justin Sherrill, Raleigh, NC (US); Stephen Benjamin, Attleboro, MA (US); Adam Růžička, Ústí nad Labem (CZ)

(73) Assignee: Red Hat, Inc., Raleigh, NC (US)

( * ) Notice: Subject to any disclaimer, the term of this patent is extended or adjusted under 35 U.S.C. 154(b) by 153 days.

(21) Appl. No.: 15/274,979

(22) Filed: Sep. 23, 2016

(65) Prior Publication Data

US 2017/0295059 A1 Oct. 12, 2017

Related U.S. Application Data

(60) Provisional application No. 62/319,756, filed on Apr. 7, 2016.

(51) Int. Cl.
*H04L 29/06* (2006.01)
*H04L 29/08* (2006.01)
*H04L 12/24* (2006.01)

(52) U.S. Cl.
CPC .......... *H04L 41/0806* (2013.01); *H04L 67/34* (2013.01); *H04L 67/42* (2013.01)

(58) Field of Classification Search
CPC ...... H04L 41/0806; H04L 67/42; H04L 67/34
USPC ........ 709/220, 222, 224, 226; 718/101, 102, 718/104
See application file for complete search history.

(56) References Cited

U.S. PATENT DOCUMENTS 9,319,300 B2 * 4/2016 Huynh Van ............. H04L 45/00
2014/0156816 A1 * 6/2014 Lopez Da Silva ... H04L 41/042
709/221

OTHER PUBLICATIONS

"Remote Execution Technology"—The Foreman, Apr. 7, 2016 http://theforeman.github.io/foreman_remote_execution/design/.*
"Foreman Remote Execution 0.2 Manuarl" Foreman Plugin Manuals, 16 pages, downloaded from http://theforeman.org/plugins/foreman_remote_execution/0.2/index.html on Apr. 7, 2016.

(Continued)

*Primary Examiner* — Randy A Scott
(74) *Attorney, Agent, or Firm* — Womble Bond Dickinson (US) LLP; Daniel E. Ovanezian

(57) ABSTRACT

A remote execution request is received from a client, specifying first and second remote execution tools and execution data pertaining to the tools and comprising a query to select host machines. First and second host machines are selected in view of a result of the query and the first and second tools. A script is generated in view of the execution data and first metadata describing components of the host machines. A plurality of execution proxy machines are selected in view of the first and second hosts. A first template associated with the first tool and a second template associated with the second tool are generated in view of the script. The first template and the second template are transmitted to first and second execution proxy machines, respectively. Outputs from remote execution of the templates are received from the first and second hosts and transmitted to the client.

20 Claims, 6 Drawing Sheets

(56) References Cited

OTHER PUBLICATIONS

"Remote Execution Technology" Foreman Remote Execution, 26 pages, downloaded from http://theforeman.github.io/foreman_remote_execution/design/ on Apr. 7, 2016.
"Facter 1.7: Core Facts—Documentation—Puppet" 19 pages, downloaded from https://docs.puppet.com/facter/1.7/.core_facts.html on Apr. 7, 2016.
Screenshots from the "Foreman" program, test environment, 24 pages, captured Apr. 7, 2016.

* cited by examiner

DISTRIBUTED REMOTE EXECUTION

RELATED APPLICATIONS

This application claims the benefit of priority to U.S. Provisional Patent Application No. 62/319,756, filed on Apr. 7, 2016, entitled "Distributed Remote Execution," the entirety of which is incorporated by reference herein.

TECHNICAL FIELD

This disclosure relates to computer systems, and more particularly, to computer systems providing remote execution.

BACKGROUND

In networked computer systems, code that is generated or stored on one machine may be executed on another machine. Such execution, referred to as remote execution, can be performed using various remote execution tools such as Secure Shell (SSH), Mcollective, Ansible, and Salt.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
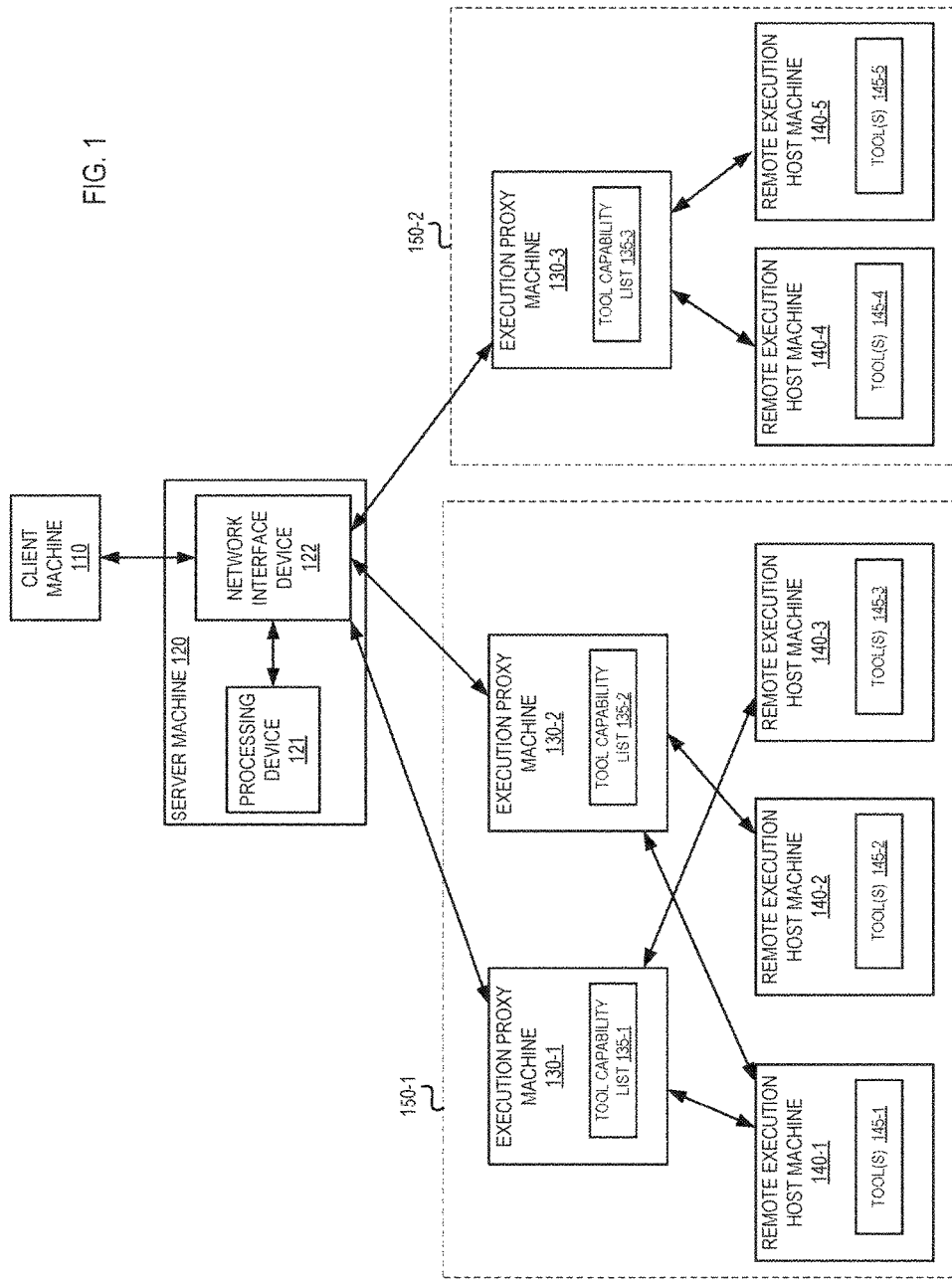
FIG. 1 depicts an illustrative computer system architecture, in accordance with an implementation of the present disclosure.

Host provisioning systems typically allow for remote execution of scripts on target hosts, and may provide to users (e.g., system administrators, etc.) remote provisioning and management of hosts running virtual machines. However, the host provisioning system typically requires direct access to the target host and has to be aware of how to perform the execution in accordance with requirements of a particular remote execution tool. As a result, a remote execution script must be customized for a particular remote execution tool, which requires that the author of the script be familiar with that remote execution tool, and requires that a script be modified for use with a different remote execution tool. Moreover, various portions of a script cannot be executed by different remote execution tools.

Aspects of the present disclosure address these and other disadvantages by providing a system for performing distributed remote execution on one more hosts in a networked computer system, which uses intermediary services and enables commands to be executed by multiple hosts via different remote execution tools (e.g., SSH, Mcollective, Ansible, Salt, etc.). That is, instead of performing the execution directly, the system uses intermediary services called execution proxies to perform the execution, thereby abstracting from the user the particular remote execution technologies employed. The data for the execution are collected and prepared on a main server, in combination with system inventory, user-provided data, and execution-technology specific implementation.

In response to an execution request by an end user, the system can initiate an execution where multiple remote execution tools might be employed at the same time, depending, for example, on a company policy, on inventory metadata describing components of the host machines, and so forth. As described in detail below, the collection of data for initiating the execution is used to execute templates on a set of selected hosts. In one implementation, the set of hosts to perform the execution is selected in view of a search query that may directly identify the host (e.g., by specifying the system names) or may specify one or more system parameters (e.g., systems with a specific version of a kernel, etc.).

As described in detail below, the execution data is used to generate a script for performing the action on the remote hosts, and the script is used to generate templates that are transmitted to one or more execution proxies. The selection of the proxies may be based on proxy loads (e.g., a number of currently running tasks, memory consumption, CPU load, etc.), affiliation with a particular organization (e.g., a cloud service provider, etc.), geolocations of the proxies, user permissions, and so forth. The proxy handles the execution itself on the hosts and acts autonomously (collects the data, performs retries in case of connection issues). Once the execution on a host is finished, it sends the data to the main server for further processing and reporting.

The data pertaining to the execution that are collected by the proxy may include metadata (the time the output was produced, the type (standard output, error output, debug message, exit code), etc.) in addition to the execution output. In some implementations, the main server can request execution data before execution on the proxy has completed, while in some other implementations, some or all of the data may be collected by the proxy and subsequently transmitted to the main server after execution has completed, thereby reducing network traffic.

In one implementation, a user may either trigger immediate execution of a script or schedule a future execution time, with the ability to define recurring logic (for example, run every day at midnight). The search query that defines the set of hosts may be evaluated either statically at invocation time, or dynamically at the time of execution.

In one implementation, authorization rules for the remote execution may be defined, including permissions based on user parameters, system parameters, inputs, and so forth. For example, a particular user may be limited to 'package install' templates for an approved list of packages and for execution on an approved list of hosts.

In one embodiment, a script may be used to generate one or more templates that are sent to one or more execution proxies. In one implementation, a template may contain metadata describing one or more of the following: a remote execution tool to execute the template, code to be generated for execution of the template, a description format (e.g., "Install package %{package}", etc.), the user who submitted the remote execution request, an input to be obtained from the user, an input to be obtained from the inventory metadata, and so forth.

In one implementation, two or more templates may be combined together, which enables common portions to be extracted to reduce duplication and facilitate template maintenance. This mechanism also enables the creation of a generic template (e.g., a generic 'package action' template, etc.) that is specialized for specific use cases. For example, a generic template with parameters 'package' and 'action' might be instantiated with a particular action (e.g., 'install', 'update', etc.), and a particular package.

Aspects of the present disclosure are thus capable of servicing client execution requests involving a plurality of remote execution tools (e.g., a first code portion to be executed via SSH, a second code portion to be executed via Salt, and so forth), and of executing the remote execution tools in parallel on a plurality of host machines. In one aspect, outputs from the host machines are sent back as soon as the outputs are available, thereby improving performance and response time. Moreover, in some implementations of the present disclosure, communications between various entities in the system (e.g., server machines, execution proxy machines, host machines) occur in response to client execution requests while avoiding unnecessary communications and the potential performance and networking issues caused by such communications (e.g., congestion, dropped packets, etc.). In contrast, remote execution systems of the prior art typically require communications in addition to the servicing of client execution requests, (e.g., to deal with networking issues such as making host machines visible to a server, making a server visible to host machines, and so forth).

In accordance with one implementation, a processing device of a server receives a remote execution request (e.g., a request to execute one or commands remotely on one or more host machines, etc.) from a client machine, where the request specifies a plurality of remote execution tools (e.g., SSH, Mcollective, Ansible, Salt, etc.), execution data pertaining to the remote execution tools, and a query to select host machines for servicing the remote execution request. In one example, the execution data might specify one or more actions to be performed, such as installing a package (e.g., an Emacs package, etc.). A plurality of host machines are then selected in view of a result of the query and the specified remote execution tools. A script is generated in view of the execution data and metadata that describes one or more components of the host machines (e.g., hardware components such as CPUs and/or memory, software components such as remote execution tools and/or operating systems, Internet Protocol [IP] addresses, etc.).

A plurality of execution proxy machines are then selected in view of the selected plurality of host machines. A plurality of templates are generated in view of the script, and are transmitted to the selected host machines. Outputs from remote execution of the templates are received from the selected hosts and transmitted to the client.

The selected execution proxy machines receive the templates, identify host machines that host the specified remote execution tools and transmit the templates to the host machines for remote execution. The selected execution proxy machines receive output of the remote executions from the host machines, generate output metadata pertaining to the remote executions, and transmit the output of the remote executions back to the server.

In one example, the server also receives from the execution proxy machines output metadata pertaining to the remote executions (e.g., at what times the output was generated, how much time the remote executions took, an output type such as standard output, error output, debug message, or exit code, etc.). In some implementations, the selection of the host machines and/or the selection of the execution proxy machines is in view of the inventory metadata. In some examples, the selection of the execution proxy machines might also be in view of one or more performance metrics (e.g., CPU loads, the number of currently running tasks, memory consumption, etc.), geographic location, user permissions, and so forth.

In some implementations, output from a remote execution of a template might be received by the execution proxy machine before the execution has completed (e.g., a partial result, a status message, a progress report, etc). In some examples, the execution proxy machine transmits output from a particular host back to the server as soon as the output is available, while in some other examples the execution proxy machine might wait until all output from all the hosts is received before transmitting the output to the server.

FIG. 1 depicts an illustrative architecture of elements of a computer system 100, in accordance with some aspects of the present disclosure. It should be noted that other architectures for computer system 100 are possible, and that the implementation of a computer system utilizing some aspects of the disclosure are not necessarily limited to the specific architecture depicted by FIG. 1.

As shown in FIG. 1, the computer system 100 comprises a client machine 110, a server machine 120, execution proxy machines 130, and remote execution host machines 140, interconnected as shown. In some examples, the execution proxy machines 130 and remote execution host machines 140 may be partitioned into groups 150 in accordance with criteria such as geographic location, affiliations/ownership (e.g., hosts might be associated with different service providers, etc.), client permissions, and so forth. It should be noted that the fact that one client machine 110 is depicted in FIG. 1 is merely illustrative, and in some other examples there might be a plurality of client machines 110. Similarly, the fact that FIG. 1 depicts one server machine 120, two groups 150, three execution proxy machines 130, and five remote execution host machines 140 is merely illustrative.

Each remote host machine 140-$i$ might be one of a server, a workstation, a mainframe, a personal computer (PC), etc. As shown in FIG. 1, each remote host machine 140-$i$ provides a set of one or more remote execution tools 145-$i$ (e.g., SSH, Mcollective, Ansible, Salt, etc.).

Similarly, each execution proxy machine 130-$i$ might be one of a server, a workstation, a mainframe, a personal computer (PC), etc. In one example, each execution proxy machine 130-$i$ has an associated tool capability list 135-$i$ that indicates which remote execution tools are provided by the host machines 140 with which the proxy machine 130-$i$ can communicate. For example, in FIG. 1 proxy machine 130-1 is able to communicate with host machines 140-1 and 140-3, and thus capability list 135-1 would be set to the union of tool(s) 145-1 and 145-3. It should be noted that in some implementations, each host might be limited to a single execution tool.

Client machine 110 is any one of a personal computer (PC), a notebook computer, a tablet computer, a smartphone, etc. Client machine 110 is capable of communicating with server 120, either directly as shown in FIG. 1, or via a network not depicted in the figure (e.g., a local-area network [LAN], a metropolitan-area network [MAN], a wide-area network [WAN], the Internet, etc.).

Server machine 120 comprises a processing device 121 and a network interface device 122 and is capable of receiving remote execution requests from client 110, selecting host machines 140 and execution proxy machines 130, distributing templates to and receiving execution results from selected execution proxy machines 130, and transmitting output of the remote executions back to client 110. Some operations of server machine 120 are described in detail below with respect to FIG. 2.

Figure 2:
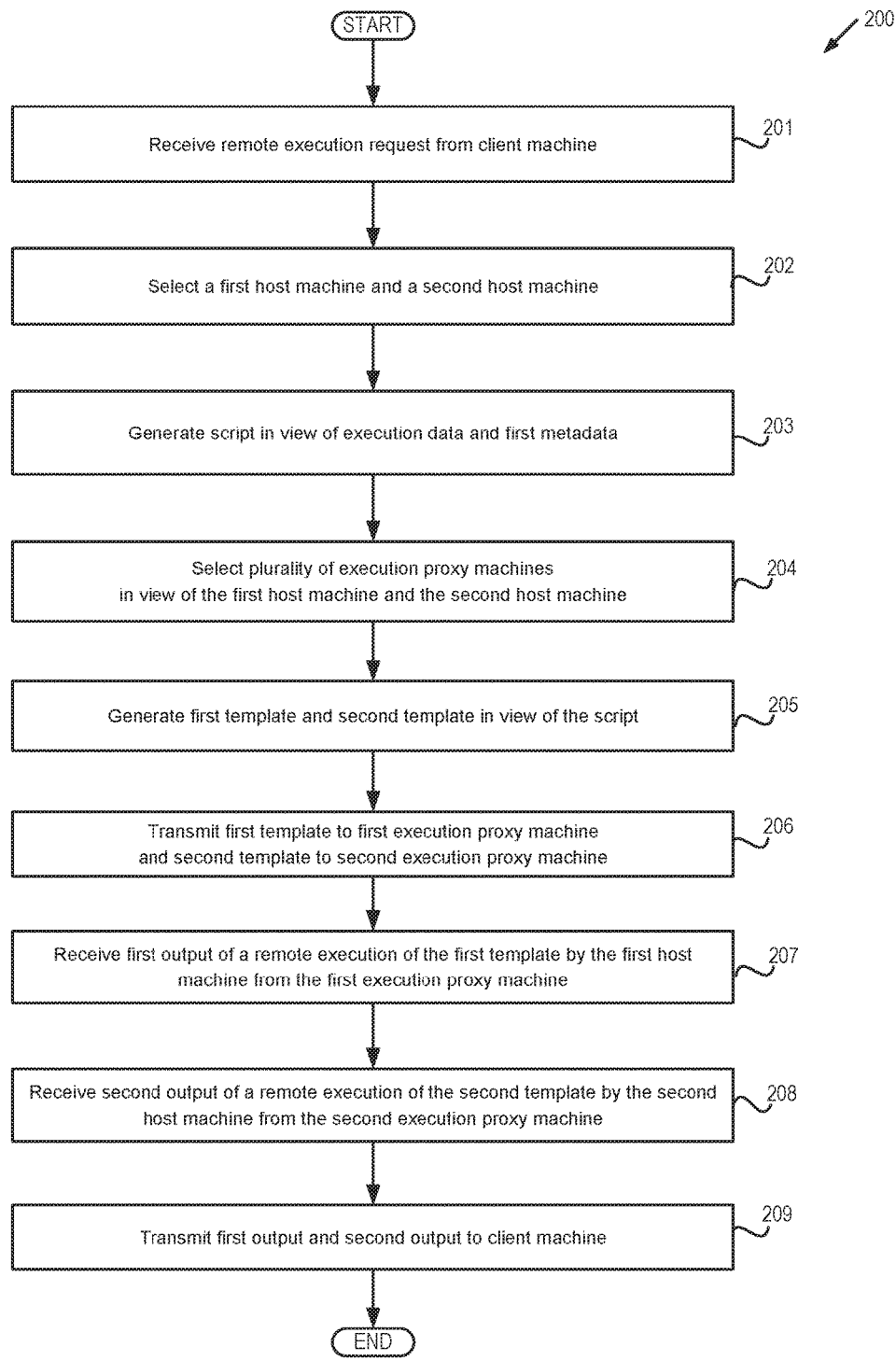
FIG. 2 depicts a flow diagram of one implementation of a first method by which a server processes remote execution requests.

FIG. 2 depicts a flow diagram of one example of a first method 200 by which a server processes remote execution requests, in accordance with one or more aspects of the present disclosure. The method is performed by processing logic that comprises hardware (circuitry, dedicated logic, etc.), and that may also comprise computer programs (such as is run on a general purpose computer system or a dedicated machine). In one implementation, method 200 is performed by computer system 100 of FIG. 1. It should be noted that in some implementations blocks depicted in FIG. 2 may be performed simultaneously or in a different order than that depicted.

At block 201, a remote execution request is received from a client machine, where the request specifies a first remote execution tool, a second remote execution tool, and execution data (e.g., actions, packages, etc.) that pertains to the first remote execution tool and the second remote execution tool and that comprises a query to select two or more of the plurality of host machines. At block 202, a first host machine and a second host machine are selected from a plurality of host machines in view of a result of the query, the first remote execution tool, and the second remote execution tool. In some implementations, the selection at block 202 might also be in view of one or more of the following: the geographic locations of host machines, user permissions, one or more performance metrics (e.g., the CPU loads of host machines, the number of tasks currently running on host machines, memory consumption on host machines, etc.), and so forth.

At block 203, a script is generated in view of the execution data and first metadata describing one or more components of the plurality of host machines (e.g., CPU, IP address, host OS, etc.). At block 204, a plurality of execution proxy machines are selected in view of the first host machine and the second host machine. In some implementations, the selection at block 204 might also be in view of one or more of the following: the first metadata, the geographic locations of proxy machines, user permissions, one or more performance metrics (e.g., the CPU loads of proxy machines, the number of tasks currently running on proxy machines, memory consumption on proxy machines, etc.), and so forth.

At block 205, a first template associated with the first remote execution tool and a second template associated with the second remote execution tool are generated in view of the script. In one implementation, the first template and second template might be associated with different remote execution tools. For example, the first template might be associated with remote execution via SSH, and the second template might be associated with remote execution via Mcollective.

In one implementation, a template may include markup language code for producing text data (e.g., Embedded Ruby [ERB], etc.), and second metadata that might include inputs to be received from a user or computer system, execution information (e.g., the remote execution technology to be used, the user associated with the remote execution request, information to generate a description of an invocation of the template, and so forth. For example, a description format "Install package %{package}" in a template, in combination with a 'package' input "postgresql" specified by a user, might result in an "Install package postgresql" command that could subsequently be used to search and categorize invocations of the template.

In one aspect, a template may comprise second metadata describing one or more of the following: code to be generated for execution of the template, a user who submitted the remote execution request, an input to be obtained from the user, an input to be obtained from the first metadata, or a particular tool for preforming the remote execution (e.g., SSH, Mcollective, Ansible, Salt, etc.). In some implementations, two or more templates may be combined into a single template. In one aspect, a plurality of smaller templates (referred to as snippets) may be used to compose a larger template; this enables portions of templates to be extracted and stored in a separate template, thereby reducing duplication and facilitating template maintenance. In another aspect, a generic template may be defined and subsequently specialized for specific use cases. For example, a generic 'package action' template having inputs 'package' and 'action' might be instantiated to obtain a particular type of template (e.g., an 'install package' template, an 'update package' template, etc.). In one example, a specialized template may import one or more inputs from the original generic template and provide one or more additional inputs. It should be noted that one or more inputs may not be available at the time of template creation (e.g., user-provided input, etc.), in which case the inputs may be represented by temporary placeholders that are subsequently instantiated (e.g., at execution time, etc.). It should further be noted that in some implementations, a template may be associated with one or more particular features (e.g., security management features, storage management features, network management features, etc.) and customized via a mapping of the features to the template.

At block 206, the first template is transmitted to a first execution proxy machine of the plurality of execution proxy machines, and the second template is transmitted to a second execution proxy machine of the plurality of execution proxy machines.

At block 207, a first output of a remote execution of the first template by the first host machine is received from the first execution proxy machine. At block 208, a second output of a remote execution of the second template by the second host machine is received from the second execution proxy machine. At block 209, the first output and the second output are transmitted to the client machine.

In some implementations, the server may also receive, from one or both of the execution proxy machines, metadata pertaining to the output of the remote template execution. In one example, the output metadata might indicates the type of output (e.g., standard output, error output, debug messages, exit codes, etc.), the times at which output was generated, how much time the executions took, and so forth.

In some implementations, output of an executed template may be transmitted to the server as soon as it is available, regardless of whether execution of the other templates has completed, while in some other implementations, the template outputs might be collected by execution proxies and then transmitted to the server at one time. In some examples, outputs received prior to completion of the remote executions might include partial results, deltas with respect to previously-received outputs, status messages, progress reports, and so forth. It should be noted that the timing of the receiving of the outputs and the type of outputs received might depend on the particular remote execution tools involved.

Figure 3:
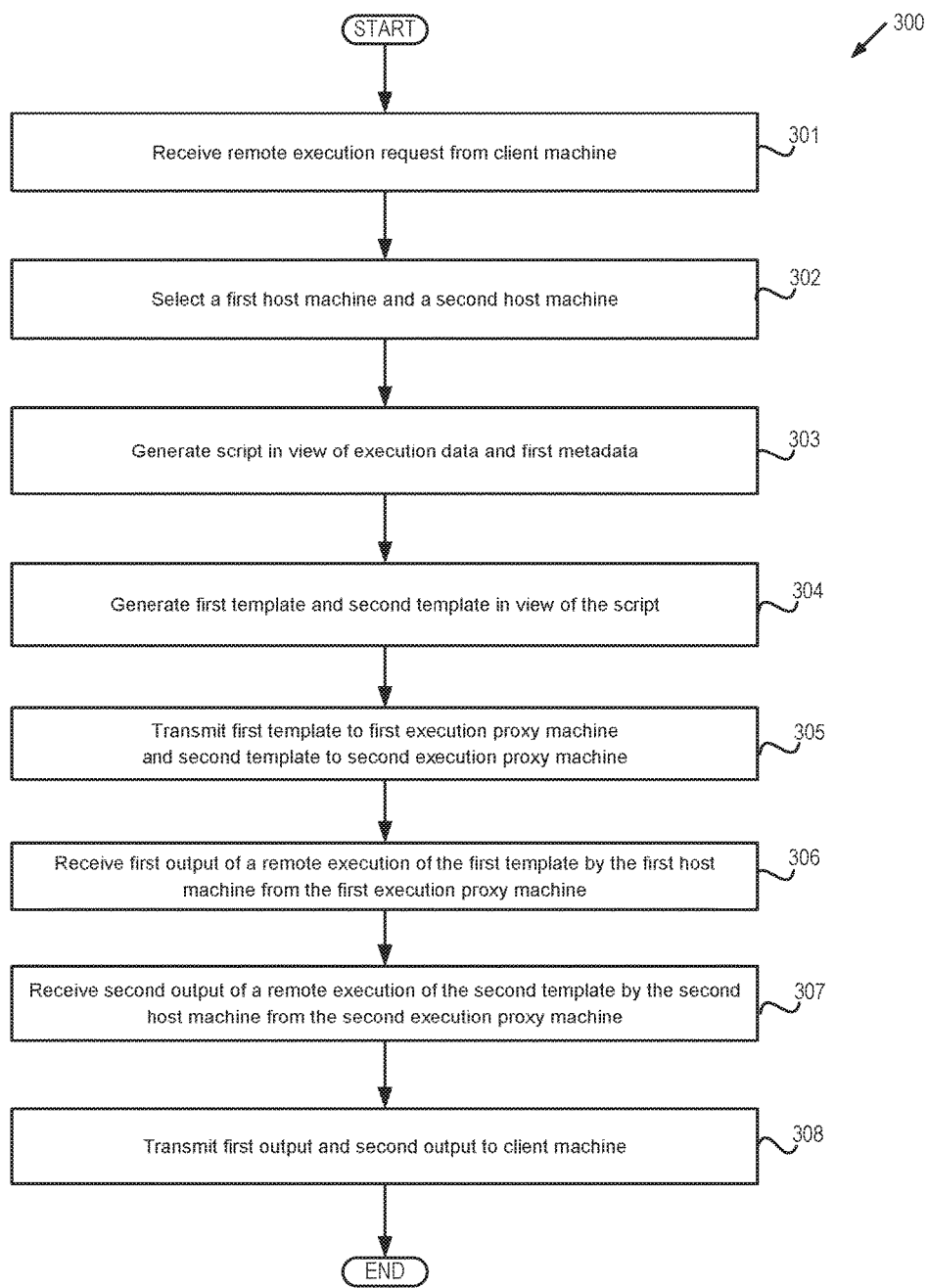
FIG. 3 depicts a flow diagram of one implementation of a second method by which a server processes remote execution requests.

FIG. 3 depicts a flow diagram of one example of a second method 300 by which a server processes remote execution requests, in accordance with one or more aspects of the present disclosure. The method is performed by processing logic that comprises hardware (circuitry, dedicated logic, etc.), and that may also comprise computer programs (such as is run on a general purpose computer system or a dedicated machine). In one implementation, method 300 is performed by computer system 100 of FIG. 1. It should be noted that in some implementations blocks depicted in FIG. 3 may be performed simultaneously or in a different order than that depicted.

At block 301, a remote execution request is received from a client machine, where the request specifies a first remote execution tool, a second remote execution tool, and execution data (e.g., actions, packages, etc.) that pertains to the first remote execution tool and the second remote execution tool and that comprises a query to select two or more of the plurality of host machines. At block 302, a first host machine and a second host machine are selected from a plurality of host machines in view of a result of the query, the first remote execution tool, and the second remote execution tool. In some implementations, the selection at block 302 might also be in view of one or more of the following: the geographic locations of host machines, user permissions, one or more performance metrics (e.g., the CPU loads of host machines, the number of tasks currently running on host machines, memory consumption on host machines, etc.), and so forth.

At block 303, a script is generated in view of the execution data and first metadata describing one or more components of the plurality of host machines (e.g., CPU, IP address, host OS, etc.). At block 304, a first template associated with the first remote execution tool and a second template associated with the second remote execution tool are generated in view of the script.

At block 305, the first template is transmitted to a first execution proxy machine and the second template is transmitted to a second execution proxy machine. At block 306, a first output of a remote execution of the first template by the first host machine is received from the first execution proxy machine.

At block 307, a second output of a remote execution of the second template by the second host machine is received from the second execution proxy machine. At block 308, the first output and the second output are transmitted to the client machine.

Figure 4:
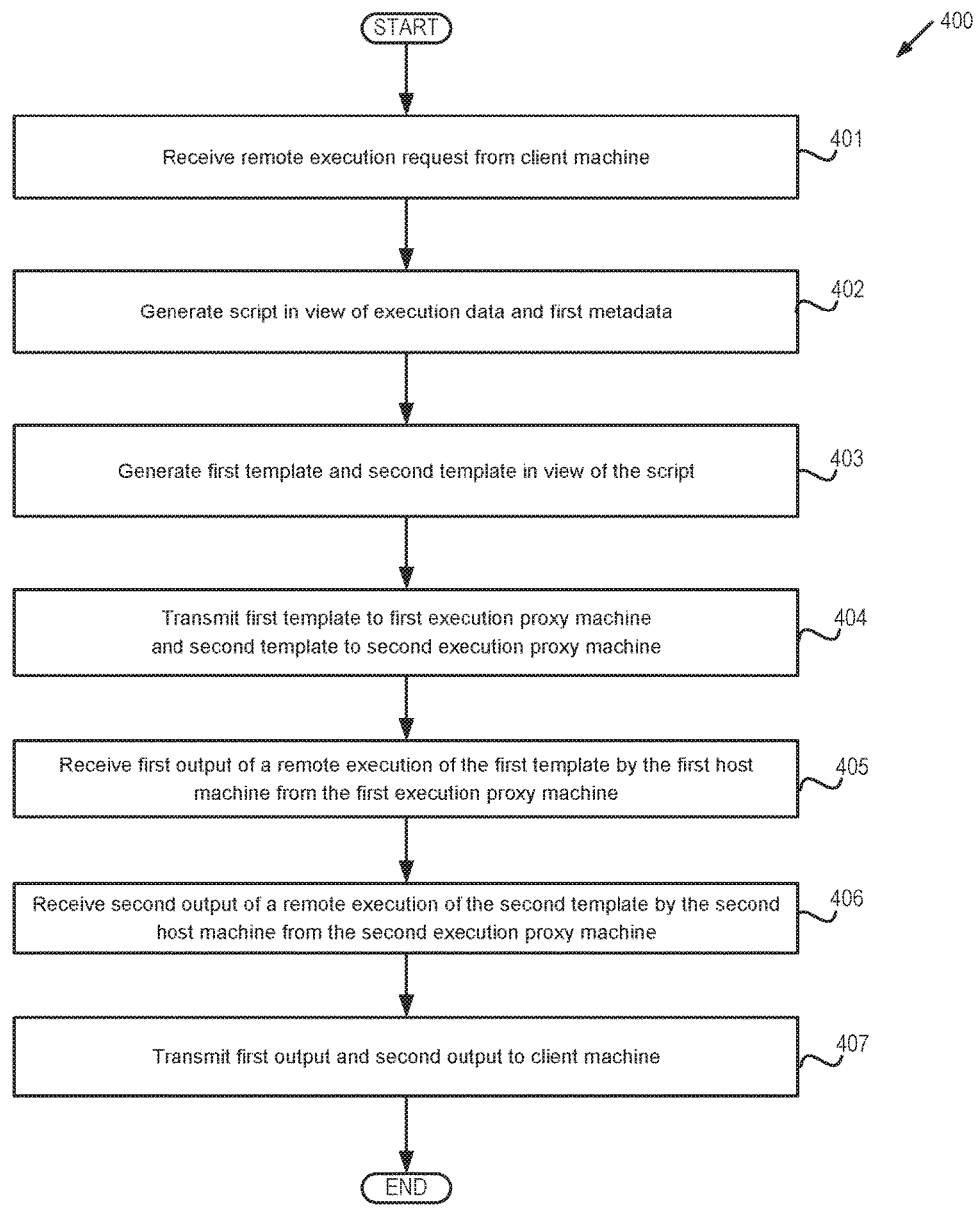
FIG. 4 depicts a flow diagram of one implementation of a third method by which a server processes remote execution requests.

FIG. 4 depicts a flow diagram of one example of a third method 400 by which a server processes remote execution requests, in accordance with one or more aspects of the present disclosure. The method is performed by processing logic that comprises hardware (circuitry, dedicated logic, etc.), and that may also comprise computer programs (such as is run on a general purpose computer system or a dedicated machine). In one implementation, method 400 is performed by computer system 100 of FIG. 1. It should be noted that in some implementations blocks depicted in FIG. 4 may be performed simultaneously or in a different order than that depicted.

At block 401, a remote execution request is received from a client machine, where the request specifies a first remote execution tool, a second remote execution tool, and execution data (e.g., actions, packages, etc.) that pertains to the first remote execution tool and the second remote execution tool and that comprises a query to select two or more of the plurality of host machines. At block 402, a script is generated in view of the execution data and first metadata describing one or more components of the plurality of host machines (e.g., CPU, IP address, host OS, etc.). At block 403, a first template associated with the first remote execution tool and a second template associated with the second remote execution tool are generated in view of the script.

At block 404, the first template is transmitted to a first execution proxy machine and the second template is transmitted to a second execution proxy machine. At block 405, a first output of a remote execution of the first template by the first host machine is received from the first execution proxy machine.

At block 406, a second output of a remote execution of the second template by the second host machine is received from the second execution proxy machine. At block 407, the first output and the second output are transmitted to the client machine.

Figure 5:
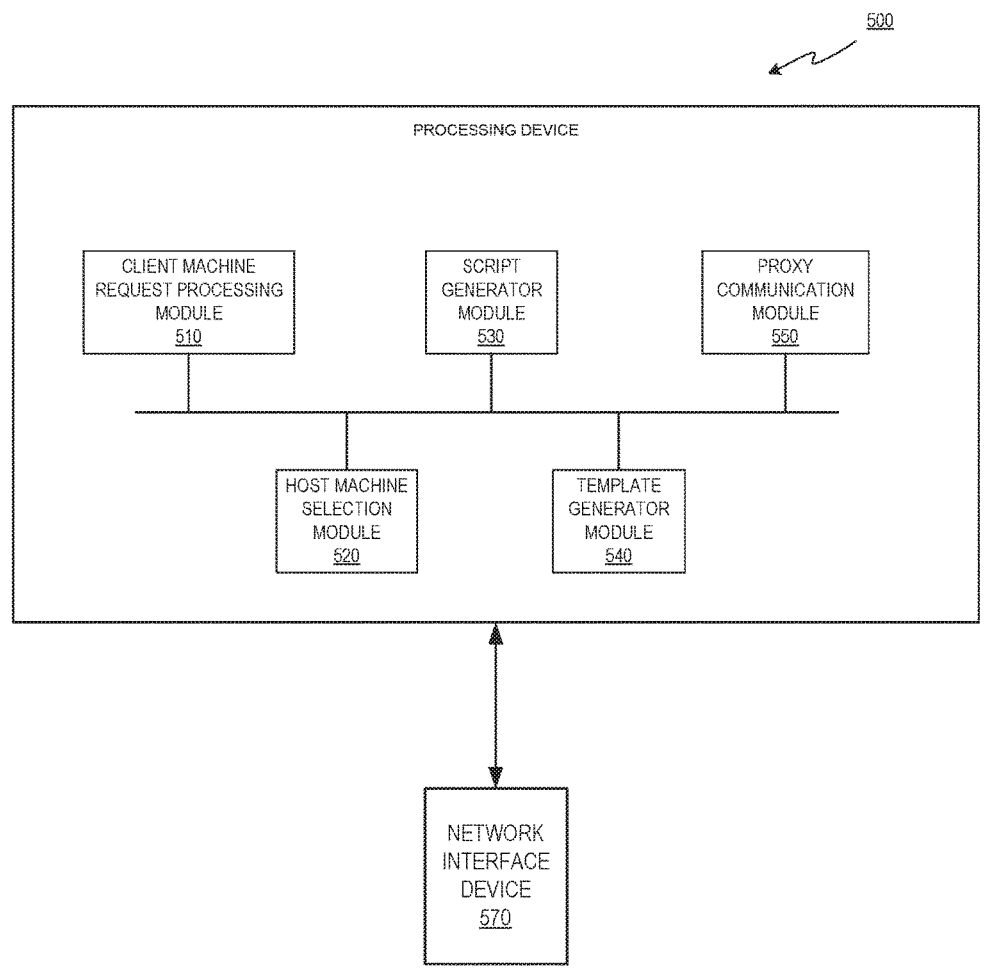
FIG. 5 depicts a block diagram of an illustrative computer system operating in accordance with one or more aspects of the disclosure.

FIG. 5 depicts a block diagram of an illustrative computer system 500 operating in accordance with one or more aspects of the present disclosure. In various illustrative examples, computer system 500 may correspond to a computing device within system architecture 100 of FIG. 1. Computer system 500 comprises a network interface device and a processing device that may include components to enable processing of remote execution requests. In one example, the processing device may include a client machine request processing module 510, a host machine selection module 520, a script generator module 530, template generator module 540, and a proxy communication module 550.

In one implementation, client machine request processing module 510 receives from a client machine, via the network interface device, a remote execution request that specifies a first remote execution tool, a second remote execution tool, and execution data that pertains to the first remote execution tool and the second remote execution tool and that comprises a query to select two or more of the plurality of host machines; and transmits to the client machine, via the network interface device, remote execution output. Host machine selection module 520 selects a first host machine and a second host machine from a plurality of host machines in view of a result of the query, the first remote execution tool, and the second remote execution tool.

Script generator module 530 generates a script in view of the execution data and first metadata describing one or more components of the plurality of host machines. Template generator module 540 generates, in view of the script, a first template associated with the first remote execution tool and a second template associated with the second remote execution tool.

Proxy communication module 550 transmits, via the network interface device, the first template to a first execution proxy machine and the second template to a second execution proxy machine; receives from the first execution proxy machine, via the network interface device, a first output of a remote execution of the first template by the first host machine; and receives from the second execution proxy machine, via the network interface device, a second output of a remote execution of the second template by the second host machine.

Figure 6:
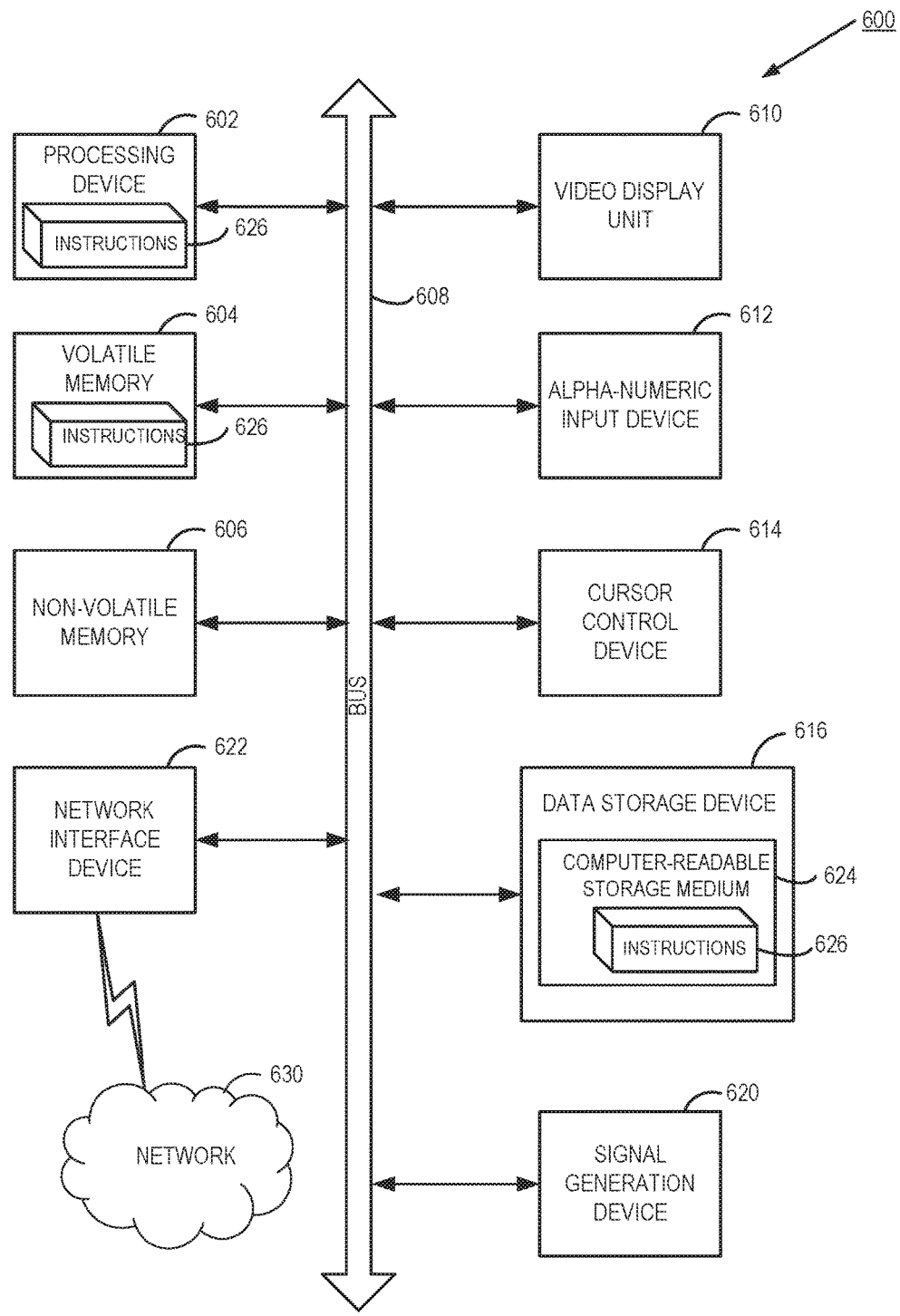
FIG. 6 depicts a block diagram of another illustrative computer system operating in accordance with one or more aspects of the disclosure.

FIG. 6 depicts a block diagram of another illustrative computer system 600 operating in accordance with one or more aspects of the present disclosure. In various illustrative examples, computer system 600 may correspond to a computing device within system architecture 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 600 may be connected (e.g., via a network 630, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alpha-numeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing methods 200, 300, and/or 400 of FIGS. 2 through 4.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by component modules or functional circuitry within hardware devices. Further, the methods, components, and features may be implemented in any combination of hardware devices and computer program components, or in computer programs.

Unless specifically stated otherwise, terms such as "receiving," "selecting," "generating," "transmitting," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 200, 300, and 400 and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:
1. A method comprising:
receiving from a client machine, by a processing device of a server, a remote execution request that specifies a first remote execution tool, a second remote execution tool, and execution data that pertains to the first remote execution tool and the second remote execution tool and that comprises a query to select two or more of the plurality of host machines;

selecting, by the processing device, a first host machine and a second host machine from a plurality of host machines in view of a result of the query, the first remote execution tool, and the second remote execution tool;

generating, by the processing device, a script in view of the execution data and first metadata describing one or more components of the plurality of host machines;

selecting by the processing device, in view of the first host machine and the second host machine, a plurality of execution proxy machines;

generating by the processing device, in view of the script, a first template associated with the first remote execution tool and a second template associated with the second remote execution tool;

transmitting the first template to a first execution proxy machine of the plurality of execution proxy machines, and the second template to a second execution proxy machine of the plurality of execution proxy machines;

receiving by the server, from the first execution proxy machine, a first output of a remote execution of the first template by the first host machine;

receiving by the server, from the second execution proxy machine, a second output of a remote execution of the second template by the second host machine; and transmitting, by the server, the first output and the second output to the client machine.

2. The method of claim 1 wherein the first template comprises second metadata describing code to be generated for execution of the first template.

3. The method of claim 1 wherein the first template comprises second metadata describing a user of the client machine who submitted the remote execution request.

4. The method of claim 3 wherein the second metadata further describes an input to be obtained from the user.

5. The method of claim 1 wherein the first template comprises second metadata describing an input to be obtained from the first metadata.

6. The method of claim 1 wherein the first template comprises second metadata describing the first remote execution tool.

7. The method of claim 1 wherein the server further receives, from the first execution proxy machine, metadata pertaining to output of the remote execution of the first template.

8. An apparatus comprising:
a network interface device; and
a processing device, operatively coupled to the network interface device, to:
  receive from a client machine, via the network interface device, a remote execution request that specifies a first remote execution tool, a second remote execution tool, and execution data that pertains to the first remote execution tool and the second remote execution tool and that comprises a query to select two or more of the plurality of host machines;
  select a first host machine and a second host machine from a plurality of host machines in view of a result of the query, the first remote execution tool, and the second remote execution tool;
  generate a script in view of the execution data and first metadata describing one or more components of the plurality of host machines;
  generate, in view of the script, a first template associated with the first remote execution tool and a second template associated with the second remote execution tool;
  transmit, via the network interface device, the first template to a first execution proxy machine and the second template to a second execution proxy machine;
  receive from the first execution proxy machine, via the network interface device, a first output of a remote execution of the first template by the first host machine;
  receive from the second execution proxy machine, via the network interface device, a second output of a remote execution of the second template by the second host machine; and
  transmit to the client machine, via the network interface device, the first output and the second output.

9. The apparatus of claim 8 wherein the selecting of the first host machine and the second machine is further in view of the first metadata.

10. The apparatus of claim 8 wherein the first execution proxy machine and the second execution proxy machine are selected from a plurality of execution proxy machines in view of the first metadata.

11. The apparatus of claim 8 wherein the first execution proxy machine and the second execution proxy machine are selected from a plurality of execution proxy machines in view of a performance metric for at least one of a plurality of execution proxy machines.

12. The apparatus of claim 8 wherein the first execution proxy machine and the second execution proxy machine are selected from a plurality of execution proxy machines in view of a geographic location of at least one of the plurality of execution proxy machines.

13. The apparatus of claim 8 wherein the first output is received prior to the first host machine completing execution of the first template.

14. The apparatus of claim 13 wherein the second output is received after the second host machine has completed execution of the second template.

15. A non-transitory computer readable storage medium, having instructions stored therein, which when executed, cause a processing device of a server to:
receive from a client machine, by the processing device, a remote execution request that specifies a first remote execution tool, a second remote execution tool, and execution data that pertains to the first remote execution tool and the second remote execution tool and that comprises a query to select two or more of the plurality of host machines;
generate, by the processing device, a script in view of the execution data and first metadata describing one or more components of the plurality of host machines;
generate by the processing device, in view of the script, a first template associated with the first remote execution tool and a second template associated with the second remote execution tool;
transmit the first template to a first execution proxy machine and the second template to a second execution proxy machine of the plurality of execution proxy machines;
receive by the server, from the first execution proxy machine, a first output of a remote execution of the first template by the first host machine;

receive by the server, from the second execution proxy machine, a second output of a remote execution of the second template by the second host machine; and transmit, by the server, the first output and the second output to the client machine.

16. The non-transitory computer readable storage medium of claim 15 wherein the first output comprises at least one of a partial result or a progress report.

17. The non-transitory computer readable storage medium of claim 15 wherein the server further transmits to the client machine metadata describing a time that the first output was generated.

18. The non-transitory computer readable storage medium of claim 15 wherein the server further transmits to the client machine metadata describing an output type of the first output.

19. The non-transitory computer readable storage medium of claim 15 wherein the server further receives from the first execution proxy machine metadata pertaining to the remote execution of the first template.

20. The non-transitory computer readable storage medium of claim 15 wherein the selecting of the plurality of execution proxy machines is further in view of one or more permissions for a user of the client machine.

* * * * *